(12) United States Patent
Gamo

(10) Patent No.: US 6,279,121 B1
(45) Date of Patent: Aug. 21, 2001

(54) DATA PROCESSING METHOD, RECORDING MEDIUM AND ELECTRONIC APPARATUS FOR EVENT HANDLING OF EXCEPTIONS IN APPLICATION PROGRAMS

(75) Inventor: Tsutomu Gamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/127,505

(22) Filed: Jul. 31, 1998

(30) Foreign Application Priority Data

Aug. 1, 1997 (JP) .................................................... 9-208202

(51) Int. Cl.⁷ .................................................... G06F 11/00
(52) U.S. Cl. .................................................... 714/15; 48/10
(58) Field of Search .................................. 714/10, 48, 57, 714/15

(56) References Cited

U.S. PATENT DOCUMENTS

| | | | |
|---|---|---|---|
| 5,155,842 | * 10/1992 | Rubin | 714/22 |
| 5,305,455 | * 4/1994 | Anschuetz | 709/100 |
| 5,539,877 | * 7/1996 | Winokur | 714/26 |
| 5,778,211 | * 7/1998 | Hohensee | 703/26 |
| 5,815,702 | * 9/1998 | Kannan | 712/244 |

* cited by examiner

Primary Examiner—Robert Beausoleil
Assistant Examiner—Bryce P. Bonzo
(74) Attorney, Agent, or Firm—Jay H. Maioli

(57) ABSTRACT

A data processing method for use with a plurality of exception processing environments executes an application program on which an object to be supplied with an error message upon occurrence of an exception event which is likely to cause interruption of the normal execution of the application program is previously registered. If an exception event occurs occurred, an exception occurrence message indicating occurrence of the exception event is sent to a pre-set object. The pre-set object supplied with the exception occurrence message, generates an error message corresponding to the exception event indicated by the exception occurrence message and sends the generated error message to the registered object. The registered object sends a message commanding execution of a pre-set process corresponding to the error message to the application program associated with the exception event.

10 Claims, 12 Drawing Sheets

DATA PROCESSING METHOD, RECORDING MEDIUM AND ELECTRONIC APPARATUS FOR EVENT HANDLING OF EXCEPTIONS IN APPLICATION PROGRAMS

BACKGROUND OF THE INVENTION

1. Field of the invention

This invention relates to a data processing method for a situation in which an exception event has occurred during execution of an application program. The present invention also relates to a computer-readable recording medium having a program for dealing with exceptions recorded thereon, and an electronic apparatus including a recording medium having a program for dealing with exceptions recorded thereon.

2. Description of Related Art

There are occasions wherein there occurs an exception event in the course of execution of an application program. The exception event is such as event as causes interruption of normal execution of an application program, such as overflow in the calculated results.

Usually, an application program is executed using an operating system as software and a processor as hardware. The exception events are classed into those of computational processing by the processor, referred to hereinafter as hardware exceptions, and those of processing by the operating system, referred to hereinafter as software exceptions.

The processing in case of occurrence of the hardware exception or software exception is explained with reference to FIG. 1.

If hardware exceptions occur, a specified exception processing unit is responsive thereto to carry out exception processing. This exception processing is supplied by the operating system. On occurrence of hardware exceptions, the exception processing unit receives from the processor a message specifying the occurrence of hardware exceptions. The message specifying the exception occurrence is defined by the processor architecture. On reception of the message specifying the exception occurrence from the processor, the exception processing unit analyzes this message to furnish to the application program the exception service associated with the exception event specified by the message specifying the exception occurrence. The services furnished by the application program are those defined by the operating system and are usually not dependant on the processor architecture.

Thus, the exception processor of the operating system on reception of the exception occurrence message defined by the processor architecture furnishes the exception service defined by the operating system to the application program. It is noted that the exception services furnished to the application program are usually not dependant on the processor architecture. Therefore, the exception processing portion of the operating system includes a processor architecture dependent portion and a processor architecture independent portion existing together.

If software exceptions are produced, a specified exception processing portion is executed in response thereto. This exception processing portion is furnished by the operating system. On occurrence of the software exceptions, an exception occurrence message, specifying the occurrence of the software exception, is delivered to the exception processing portion from the routine processing portion responsible for routine processing in the operating system. The exception occurrence message is defined by the operating system. The exception processing portion analyzes the exception occurrence message received from the routine processing portion to furnish the exception service corresponding to the exception event specified by the exception occurrence message to the application program. The exception service furnished to the application program is that defined by the operating system and is usually independent of the processor architecture.

If an exception event has occurred, it needs to be responsive to the requests or properties of the application program regarding which services should be furnished from the operating system to the application program. It is therefore required of the operating system to have an exception processing portion having an interface which meets with the properties or requests of different application programs. That is, for satisfying properties or requests of a variety of the application programs, it is required of the operating system to have plural different interfaces as interfaces pertinent to exception processing. The environments furnished by the exception processing portions of different interfaces are herein termed 'exception processing environments'.

As a method for furnishing a plurality of different exception processing environments, there is a method for emulating the exception processing environment, as shown in FIG. 2. At this time, the operating system furnishes, as a principle, only a sole exception processing environment on which a software module furnishing another exception processing environment is superimposed as an emulator by way of emulation of the other exception processing environment.

This method can be implemented relatively easily when it is attempted to furnish plural exception processing environments on an operating system furnishing only a sole exception processing environment. However, there is raised a problem that the speed of execution is retarded due to the load caused by applying the additional software module for emulation. There is also raised a problem that it is difficult to add dynamically plural exception processing environments.

There may be contemplated a method for overcoming the problem inherent in the method for emulating the exception processing environment to furnish plural exception processing environments by the operating system simultaneously. The present Assignee has already proposed a data processing method and apparatus implementing plural environments in Japanese Patent Application HEI-No.8-67881.

If the operating system furnishes plural exception processing environments simultaneously, the respective exception processing environments depend on the processor architecture. Specifically, on occurrence of hardware exceptions, each exception processing environment receives the exception occurrence message defined by the processor architecture to furnish the exception service corresponding to the exception event specified by the exception occurrence specifying message, so that each exception processing environment is dependent on the processor architecture.

However, if each exception processing environment is dependent on the processor architecture, it becomes necessary to take the processor architecture for each of the exception processing environments into account thus increasing the labor required in furnishing the exception processing environments. That is, if desired to furnish plural exception processing environments simultaneously by the operating system, a lot of labor is required in assembling plural exception processing environments because of the necessity of taking the processor architecture into account for each of the exception processing environments.

SUMMARY OF THE INVENTION

It is therefore an object of the present invention to provide a data processing method for coping with an exception event that has occurred during execution of an application program whereby plural exception processing environments can be incorporated easily.

It is another object of the present invention to provide a computer-readable recording medium having recorded thereon a program for implementing this data processing method and an electronic apparatus having this recording medium.

When executing an application program in the data processing method of the present invention, an object to be fed with an error message on occurrence of an exception event which is likely to cause interruption of the normal execution of the application program is previously registered. If an exception event has occurred in the course of execution of the application program, an exception occurrence message indicating the occurrence of the exception event is sent to a pre-set object. The object, thus fed with the exception occurrence message, generates an error message corresponding to the exception event indicated by the exception occurrence message and sends the generated error message to the registered object. The object fed with the error message then sends a message commanding execution of a pre-set processing operation corresponding to the error message to the application program responsible for the exception event.

In the present data processing method, the exception occurrence message specifying occurrence of an exception event is converted by the pre-set object to an error message corresponding to the exception event specified by the exception occurrence message. This error message is sent to the registered object. Thus, if the exception occurrence message is dependent on the processor architecture, the error message sent to the registered object is not dependent on the processor architecture. That is, with the present data processing method, it is only necessary to take the processor architecture into account for the pre-set object, while it is unnecessary to take the processor architecture into account otherwise.

A recording medium according to the present invention is a computer-readable recording medium having recorded thereon an exception accommodating program. This exception accommodating program performs processing of registering an object fed with an error message on occurrence of an exception event which might lead to interruption of normal execution of the application program in executing the application program, processing of causing a pre-set object to receive an exception occurrence message specifying occurrence of an exception event if such exception event has occurred, processing of causing the object receiving the exception occurrence message to generate an error message corresponding to the exception event specified by the exception occurrence message and of sending the error message to the registered object and processing of sending a message to the application program responsible for the exception event by an object fed with the error message. The message commands execution of a pre-set processing corresponding to the error message.

In the present exception accommodating program, the exception occurrence message specifying occurrence of an exception event is converted by the pre-set object to an error message corresponding to the exception event specified by the exception occurrence message. This error message is sent to the registered object. Thus, if the exception occurrence message is dependent on the processor architecture, the error message sent to the registered object is not dependent on the processor architecture. That is, with the present exception accommodating program, it is only necessary to take the processor architecture into account for the pre-set object, while it is unnecessary to take the processor architecture into account otherwise.

An electronic apparatus according to the present invention has a recording medium having an exception accommodating program recorded thereon. This exception accommodating program performs processing of registering an object fed with an error message on occurrence of an exception event which might lead to interruption of normal execution of the application program in executing the application program, processing of causing a pre-set object to receive an exception occurrence message specifying occurrence of an exception event if such exception event has occurred during execution of the application program, processing of causing the object receiving the exception occurrence message to generate an error message corresponding to the exception event specified by the exception occurrence message and of sending the error message to the registered object and processing of sending a message to the application program responsible for the exception event by an object fed with the error message. The message commands execution of a pre-set processing corresponding to the error message.

In the present exception accommodating program, the exception occurrence message specifying occurrence of an exception event is converted by the pre-set object to an error message corresponding to the exception event specified by the exception occurrence message. This error message is sent to the registered object. Thus, if the exception occurrence message is dependent on the processor architecture, the error message sent to the registered object is not dependent on the processor architecture. That is, with the present exception accommodating program, it is only necessary to take the processor architecture into account for the pre-set object, while it is unnecessary to take the processor architecture into account otherwise.

Thus, according to the present invention, if plural exception processing environments are built into a sole operating system, it is unnecessary to take the processor architecture into account every exception processing environment, thus facilitating assembling of plural exception processing environments.

DESCRIPTION OF PREFERRED EMBODIMENTS

Figure 1:
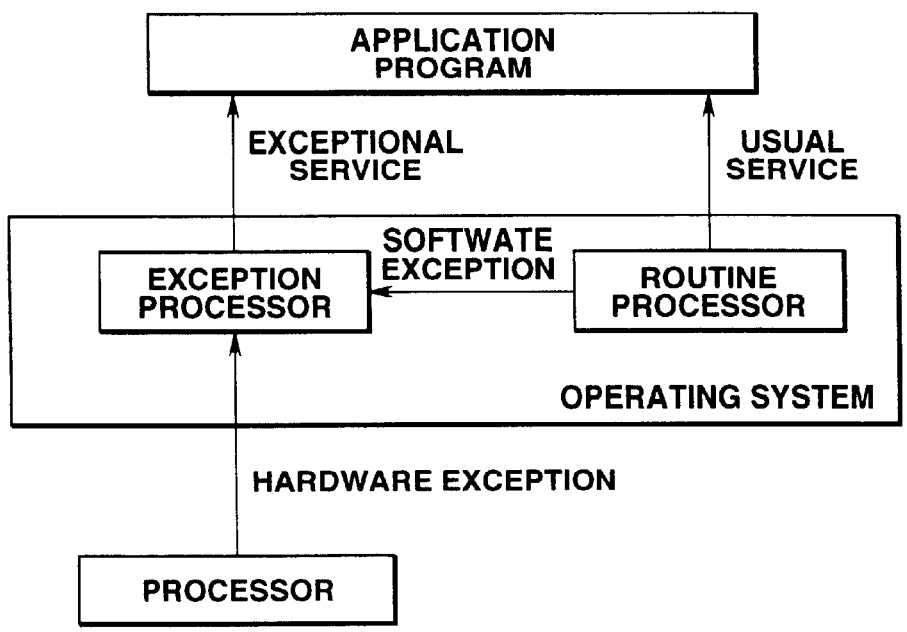
FIG. 1 illustrates an exception processing in a conventional operating system.
Figure 2:
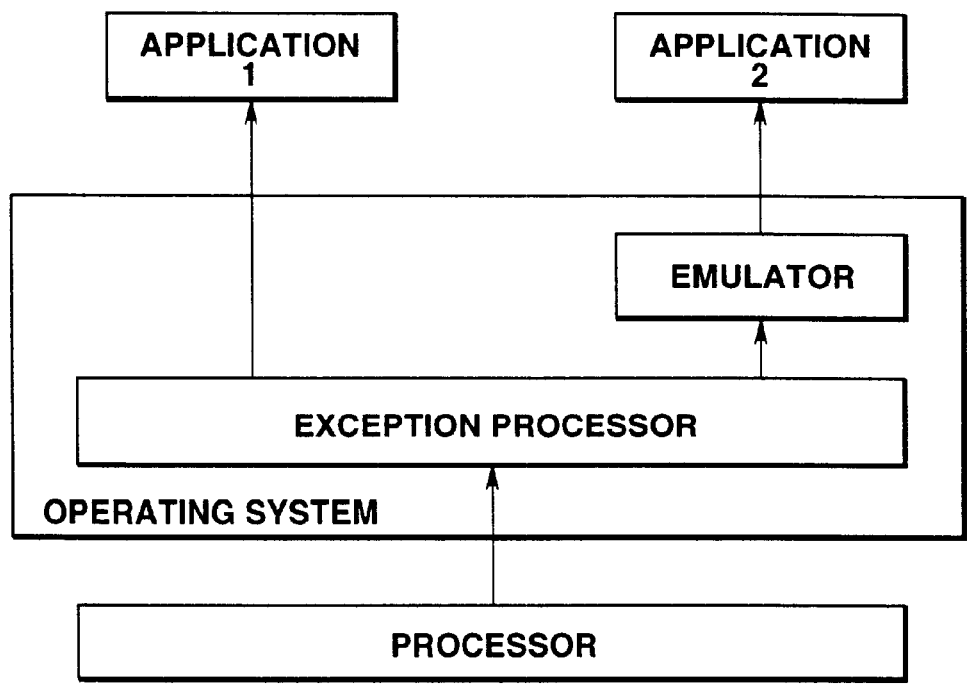
FIG. 2 illustrates a method for constructing plural exception processing environments by emulation.

Referring to the drawings, preferred embodiments of the present invention will be explained in detail.

The present invention is applied to a system furnishing plural different environments as the application program executing environments. These environments are herein termed 'met a spaces'. In the following description, an exception processing environment is furnished for each metaspace.

1. Hardware Environments

First, an example of the hardware configuration embodying the present invention is explained with reference to FIG. 1. Although the present invention is applied herein to a television device, the present invention can, of course, be applied to other electronic apparatus. That is, the present invention can be extensively applied to any other electronic apparatus as well. That is, the present invention can be extensively applied to an electronic apparatus having an environment in which to execute the application program, such as audio visual devices (AV devices), a variety of office equipments or computers in general.

Figure 3:
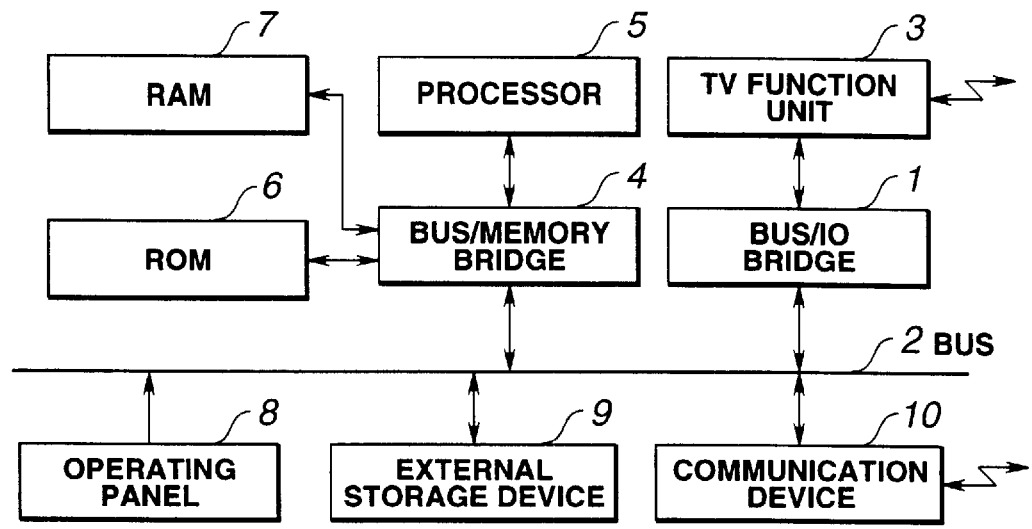
FIG. 3 shows schematics of an example of a television apparatus embodying the present invention.

The television device shown in FIG. 3, as an electronic apparatus to which the present invention is applied, receives signals from a broadcasting station over a antenna or a cable to display a picture on a picture display device, such as a Braun tube or liquid crystal, based on the received signals.

This television device not only has a routine television function, but also can receive programs or data from outside. Specifically, the television device includes a television function unit 3 connected to a bus 2 via a bus/IO bridge 1, a processor 5 connected to the bus 2 via bus/memory bridge 4, a read-only memory (ROM) 6 and a random-access memory (RAM) 7, both connected to the processor 5 via the bus/memory bridge 4, and an operating panel 8, an external memory device 9 and a communication device 10, all connected to the bus 2.

The television function unit 3 has the function of reproducing a picture or speech based on signals received over an antenna or a cable. This television function unit 3 is connected to the bus via bus/memory bridge 1 for exchanging signals with the remaining portions.

The processor 5 controls various portions of the television device and is connected to the bus 2 via the bus/memory bridge 4. To the processor 5 are connected the ROM 6 and the RAM 7 via the bus/memory bridge 4. The ROM 6 has stored therein an operating system or an application program for performing control by the processor 5. The RAM 7 is used as a working area of the processor 5. That is, the processor 5 executes the operating system or the application program stored in the ROM 6 using the RAM 7 as a working area to control various parts of the television device.

The operating panel 8 is an input device for accepting an operating input from the user. From this operating panel 8 is entered a signal instructing switching of the television channels or volumes. Specifically, this operating panel 8 is an inputting device having plural buttons usable for inputting various signals and a pointing device known as mouse. The signal entered by this operating panel 8 is entered via bus 2 and the bus/memory bridge 4 to the processor 5, which then executes computing operations based on input signals via operating panel 8 to control various portions.

The external storage device 9 is comprised of, for example, a hard disc drive, and is used for recording picture data, control data or a program downloaded via communication device 10 from outside. The communication device 10 is an input/output unit for having data communication with outside and is made up of, for example, a modem or a terminal adapter.

This television device not only has the usual television function furnished via the television function unit 3, but can accept programs or data from outside via communication device 10. For example, in making version-up of the operating system, this television device accepts the new software module from the external network via communication device 10 to make version-up of the operating system.

With the present television device, the processor 5 executes the operating system stored in the ROM 6 and the application program stored in the ROM 6 or the external storage device 9 on this operating system to control various parts. The operating system of the present embodiment is an operating system which applies the object-oriented programming and which furnishes plural metaspaces.

The application program is executed on the metaspaces applying the objet-oriented programming and which are suited to the application program in use. For example, the application program for displaying a moving picture on the television function unit 3 is executed on the mAV metaspace as later explained, while the apparatus for implementing the Graphical User Interface (GUI) for controlling the operating panel 8 is executed on the mCOOP metaspace as later explained.

With the television device according to the present invention, the exception processing to be executed by the operating system on occurrence of an exception event which possibly leads to interruption of normal execution of the application program is defined from one metaspace to another. Thus, the exception processing carried out on occurrence of the exception event differs from the mAV metaspace and the mCOOP metaspace.

2. Software Environment

The exception processing, which is carried out in the television device shown in FIG. 3 on occurrence of an exception event which might lead to interruption of normal execution of the application program, is explained by taking examples of exception processing in a mAV metaspace as a first metaspace furnished by the operating system and exception processing in a mCOOP metaspace as a second metaspace furnished by the operating system. Although the mAV metaspace and the mCOOP metaspace are taken as examples in the following explanation, the operating system may, of course, furnish metaspaces other than those given above.

2-1 Exception Processing in mAV Metaspace

The mAV metaspace is a metaspace in which a so-called procedure type program is executed. The application program executed on the mAV metaspace is described as a sole object. Meanwhile, 'm' and 'AV' of mAV metaspace refer to the metaspace and to the audio and video, respectively.

Figure 4:
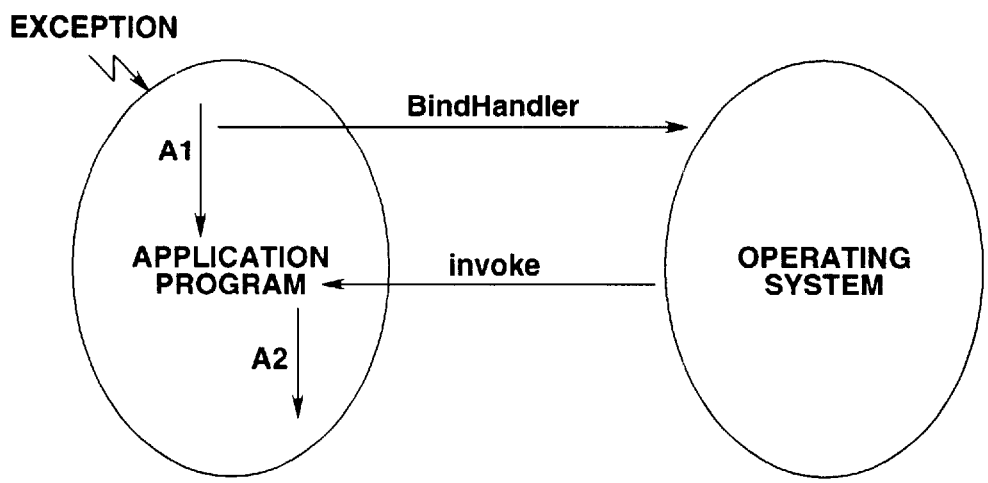
FIG. 4 illustrates exception processing in a mAV metaspace.

FIG. 4 schematically shows the operation for exception processing on the mAV metaspace. When executing an application program on the mAV metaspace, a message [BindHandler] is first sent by a procedure A1 contained in the application program, while a procedure A2 contained in the application program is registered as a procedure for exception processing, as shown in FIG. 4. The procedure A1 states the procedure for registering the procedure for exception A2 in the operating system, while the procedure A2 states the procedure for exception processing carried out on occurrence of an exception event.

After making the above registration, the application program is carried out. If, during execution of the application program, such exception event as leads to interruption of normal execution of the application program, the operating system invokes the procedure A2 of the application program to execute the invoked procedure.

In this mAV metaspace, since the application program is stated as a procedure type program, the application program is made up of a sole program. Therefore, the exception notification from the operating system to the application program is sent to the procedure A2 stated in the sole object constituting an application program.

2-2 Exception Processing on mCOOP Metaspace

The mCOOP metaspace is a metaspace on which is executed the so-called parallel type object-oriented program. The application program executed on the mCOOP metaspace is usually made up of plural objects. Meanwhile, 'm' and 'COOP' of the mCOOP metaspace refer to a metaspace and concurrent object oriented programming, respectively.

Figure 5:
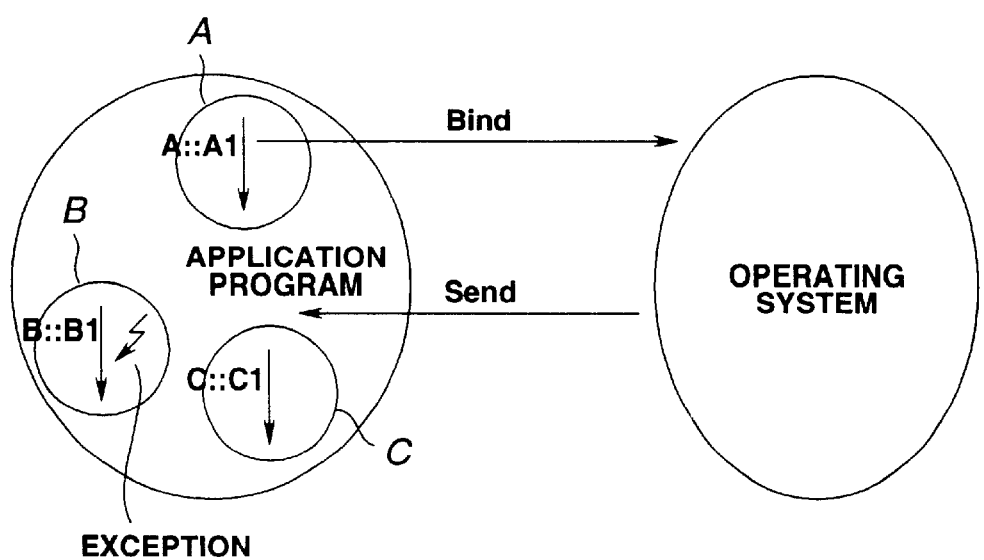
FIG. 5 illustrates exception processing in mCOOP metaspace.

FIG. 5 schematically shows the operation of exception processing on the mCOOP metaspace. Referring to FIG. 5, in executing the application program on the mCOOP metaspace, a message [Bind] is first sent to the operating system by the method A1 of the object A contained in the application program and a method C1 of the object contained in the application program is registered as an exception processing method. It is noted that the method A1 states the procedure for registering the method C1 for exception processing in the operating system and the method C1 states the processing of exception processing that is carried out on occurrence of n exception event.

After the above registration, the application program is executed. Specifically, the object B, stating the main processing in the application program, is executed. The object B is usually made up of plural objects. If, during execution of the object B, an exception event which possibly leads to interruption of a normal execution has occurred, the operating system sends a message [send] to the above object C to execute the method C1 (C: C1) of the object C.

In this mCOOP metaspace, since the application program is stated in the object-oriented program, the application program is usually constructed by plural objects. In the object advised of the exception from the operating system, any suitable object can be registered. That is, in the mCOOP metaspace, a method of an optional object can be registered by a message [Bind] as a method that is executed on occurrence of an exception event.

2-3 Object

Figure 6:
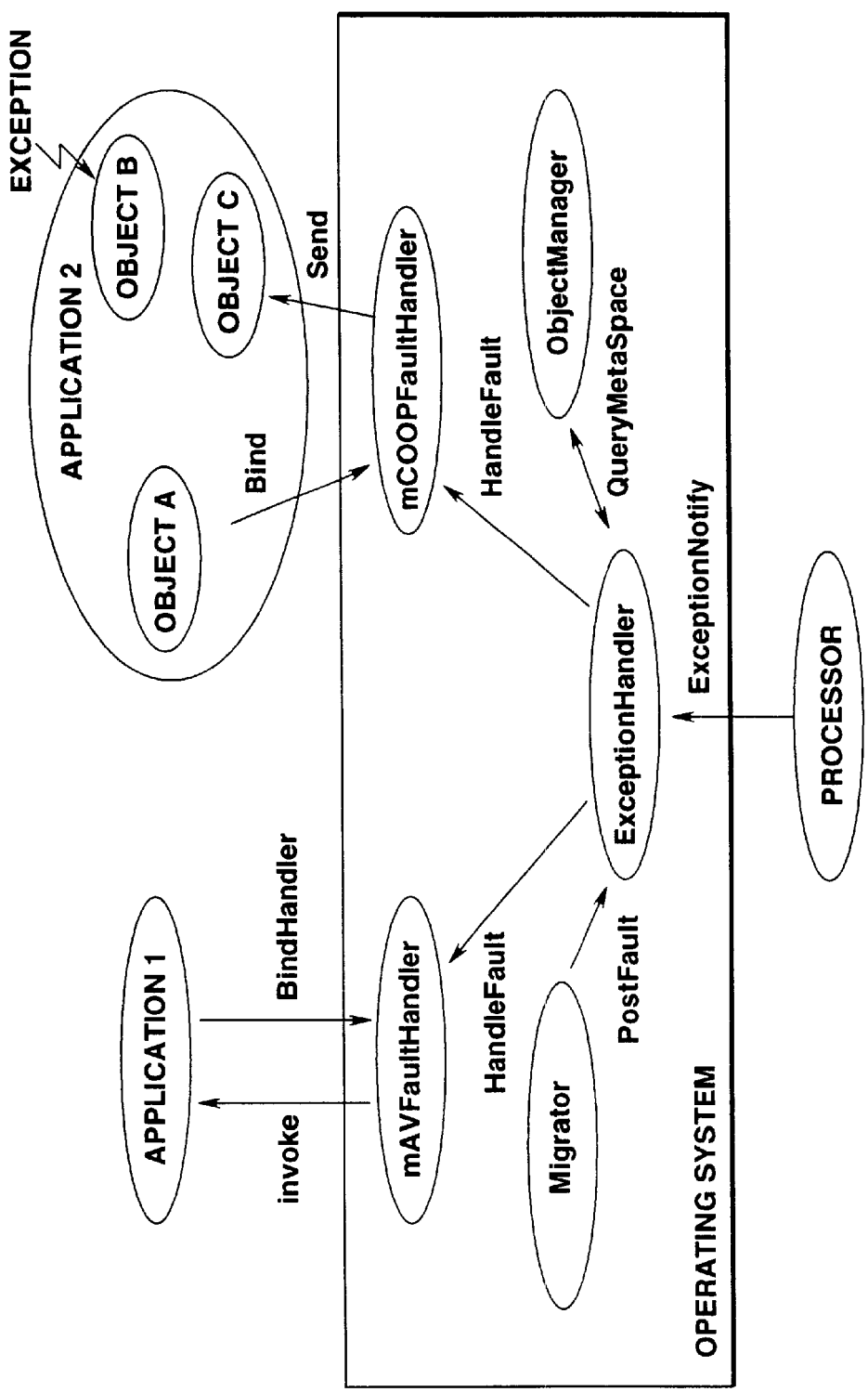
FIG. 6 illustrates the object correlation in an embodiment of the present invention.

For executing the exception processing as shown in FIGS. 4 and 5, the objects furnished in the present embodiment are explained with reference to FIG. 6 showing the relation between the objects. In the following description, 'metaobject' denotes an object constituting this operating system.

In the present embodiment, the operating system has an object [ExceptionHandler] an object [Migrator] and an object [ObjectManager], as metaobject for coping with exception events, as shown in FIG. 6.

The operating system has an object [FaultHandler] as a metaobject for coping with the exception event. This object [FaultHandler] is an object sending a message commanding a pre-set processing for the exception event that has occurred. This object is generated from one metaspace to another. In the present embodiment, an object [mAVFaultHandler] corresponding to the mAV metaspace and an object [mCOOPFaultHandler] corresponding to the mCOOP metaspace are provided as a mAV metaspace, as shown in FIG. 6. These objects are hereinafter explained.

2-3-1 Exception Handler

For the message entered for the object [ExceptionHandler], the input message, the method executed on inputting the message and the message outputted on executing the method are shown in Table 1.

TABLE 1

| input message | method | output message |
|---|---|---|
| Exception Notify | 1. Analysis of Exception<br>2. Conversion to VFID<br>3. Identification of FaultHandler<br>4. Notification to FaultHandler | 1. QueryMetaSpace<br>2. HandleFault |
| PostFault | 1. Indentification of FaultHandler<br>2. Notification to FaultHandler | 1. QueryMetaspace<br>2. HandleFault |

If an exception event (hardware exception) in the computing processing of a processor is produced on execution of the application program, a message [ExceptionNotify] indicating the occurrence of the hardware exception is entered in the object [ExceptionHandler]. With the message [ExceptionNotify], since the exception event is the hardware exception, the message is processor architecture dependent. When the message [ExceptionNotify] is entered, the object [ExceptionHandler] is executed.

In the method executed on inputting the message [ExceptionNotify], it is analyzed, based on the message [ExceptionNotify] indicating the occurrence of the hardware exception, which exception event has occurred. Then, based on the results of analysis, there is generated an exception identifier vFID specifying which exception event has occurred. That is, the message [ExceptionNotify] is converted to a processor architecture independent exception identifier vFID.

Then, after specifying the object responsible for the exception event, a message [QueryMetaSpace] is sent to the object [ObjectManager] to inquire which is the object [FaultHandler] corresponding to the metaspace in which the object responsible for the exception event is put. This identifies the object [FaultHandler] corresponding to the metaspace in which the object responsible for the exception event is put. Finally, a message [HandleFault] specifying the object responsible for the exception event and the exception identifier vFID corresponding to the exception event is sent to the object [FaultHandler] identified as above.

If, on executing the application program, an exception event (software exception) occurs in a metaobject, a message indicating occurrence of the software exception is sent to the object [ExceptionHandler], which object [ExceptionHandler] executes the method when the message [PostFault] is entered.

Since the exception event is the software exception, the message [PostFault] is dependent on the operating system instead of on the processor architecture. That is, an exception identifier vFID defined by the operating system is included in the message [PostFault].

The method executed when the message [PostFault] is entered is similar to the method executed when the message [ExceptionNotify] is entered. However, since the exception identifier vFID is sent by the message [PostFault], the exception event is not analyzed, while conversion to the exception identifier vFID is not made.

That is, in the method executed when the message [PostFault] is entered, the object responsible for the exception event is first specified. The message [QueryMetaSpace] is sent to the object [ObjectManager] to make an inquiry which is the object [FaultHandler] corresponding to the metaspace in which is put the object responsible for the exception event. A message [HandleFault] informing the above identified object [FaultHandler] of the object responsible for the exception event and the exception identifier vFID corresponding to the exception event is sent to the object [FaultHandler].

The technique of converting the processor architecture dependent exception information into an exception identifier VFID is explained taking, as an example of, a case in which an overflow is produced in the floating decimal point processing with a R4300 processor. It is assumed that the value of the exception identifier vFID equal to [fFP-OVERFLOW] specifies that an overflow is produced in the floating decimal point processing.

If the exception event is produced in the R4300 processor, the cause is recorded in a register termed [Cause register] of the coprocessor. The value recorded in the register [CX-FPE] indicates that an exception event concerning the floating decimal point processing has been produced. On occurrence of the exception event concerning the floating decimal point processing, the bits corresponding to the overflow of the floating decimal point are set as further detailed information of the exception event in the register termed [FCRregister] of the floating decimal point coprocessor.

Thus, the R4300 processor checks the information recorded in the register [Cause register] and, if the value recorded in this register is [CX_FPE], it is seen that the exception event concerning the floating decimal point processing has occurred. The information recorded in the register [FCRregister] is further checked in order to realize that exception event concerning the floating decimal point has occurred.

In the present embodiment, the value of the exception identifier vFID is [EP_OVERFLOW] indicating that overflow has been produced in the floating decimal point processing. This conversion to the exception identifier vFID is in need of the processor register value and hence is processor architecture dependent. However, this conversion is easy in many cases.

By converting the processor architecture dependent information by the object [ExceptionHandler] into the processor architecture independent exception identifier vFID, the object other than the object [ExceptionHandler] is processor architecture independent. Therefore, if this operating system is re-mounted on a different processor architecture, it is only necessary to convert the converting portion to the exception identifier vFID of the object [ExceptionHandler] so that re-mounting to the different processor architecture can be achieved extremely easily.

2-3-2 ObjectManager

Table 2 shows, for the object [ObjectManager], an input message, a method executed when the message is entered and a message outputted on executing the method:

TABLE 2

| input message | method | output message |
|---|---|---|
| RegisterObject | objet registration | |
| RegisterHandler | objet registration | |
| QueryMetaspace | 1. Retrieval of metaspace where the object is present<br>2. Retrieval of FaultHandler corresponding to the metaspace<br>3. Notification of results to ExceptionHandler | Notification to FaultHandler |

On generation of the object, the object [ObjectManager] receives a message from these objects and executes the method of registering the information concerning these objects.

Specifically, if objects other than the object [FaultHandler] are generated, the object [ObjectManager] receives a message [RegisterObject] to register the information concerning the generated object. It is noted that the information contained in the [RegisterObject] is the information concerning the ID or name of the generated object and the information concerning the metaspace in which the object is executed.

If the object [FaultHandler] is generated, the object [ObjectManager] receives the message [RegisterHandler] to register the information concerning the generated object. It is noted that the information contained in the message [RegisterHandler] is the information on the ID and the name of the generated object and the information as to which metaspace the object is associated with.

When fed with the message [QueryMetaSpace] from the object [ExceptionHandler], the object [ObjectManager] retrieves the information as to the object [FaultHandler] corresponding to the metaspace in which is present the object specified by the object designated by the message [QueryMetaSpace] to return the information to the object [ExceptionHandler].

Specifically, when fed with the message [QueryMetaSpace] from the object [ExceptionHandler], the object [ObjectManager] retrieves the metaspace in which is present the object specified by the object designated by the message [QueryMetaSpace] by having reference to the information previously registered by the message [RegisterHandler]. The object [ObjectManager] then returns the information acquired by this retrieval to the object [ExceptionHandler].

2-3-3 [mAVFaultHandler]

As to the object [mAVFaultHandler], an input message, method executed when the message is entered and a message outputted on executing the method are shown in Table 3:

TABLE 3

| input messages | methods | output messages |
|---|---|---|
| BindHandler | handler registration | |
| UnbindHandler | cancel handler registration | |
| HandleFault | 1. Handler retrieval<br>2. Start handler if handler is found<br>3. Execute default processing if otherwise | start handler |

The object [mAVFaultHandler] is an object [FaultHandler] corresponding to the [mAVFaultHandler] metaspace and is used on occurrence of an exception event by an object on the mAV metaspace.

When fed with a message [BindHandler] from an object on the mAV metaspace, the object [mAVFaultHandler] registers the procedure designated by the message [BindHandler] as a handler for the exception identifier designated by the message [BindHandler]. The handler designated herein means the procedure for the exception identifier. In the following explanation, the exception identifier is termed an exception identifier mAVFID.

Also, when fed with the message [UnbindHandler] from the object on the mAV metaspace, the object [mAVFaultHandler] cancels the registration for the handler designated by the message [UnbindHandler].

When fed with the message [HandleFault] from the object [ExceptionHandler], the object [mAVFaultHandler] executes the method in accordance with the message [HandleFault].

In this method, the exception identifier vFID sent by the message [HandleFault] is first converted to the exception identifier mAVFID as found on the mAV metaspace and a handler associated with the exception identifier mAVFID is searched. The handler to be searched is such a handler registered by the above message [BindHandler] for the object designated by the message [BindHandler].

If the handler registered is found, a message is sent to the object responsible for the exception event to start the registered handler. On the other hand, if no handler has been registered for the object designated by the message [HandleFault] or if conversion from the exception identifier vFID to the exception identifier mAVFID has failed, the exception processing of the default previously registered in the mAV metaspace is carried out in accordance with the exception identifier VFID sent with the message [HandleFault].

Specifically, as the exception processing for default, the processing of deleting the object is previously registered in the mAV metaspace. If no handler has been registered for the object designated by the message [HandleFault] or if conversion from the exception identifier vFID to the exception identifier mAVFID has failed, appropriate messages are sent to plural metaobjects relevant to the mAV metaspace to delete the object. If the exception event specified by the exception identifier vFID is such an exception event that enables restoration of the processing in the mAV metaspace, it is also possible to send appropriate messages to plural objects relevant to the mAV metaspace in order to restore the object.

2-3-4 mCOOPFaultHandler

As to the objet [mCOOPFaultHandler], the input messages, methods executed when the messages are entered and output messages outputted on execution of the methods, are shown in Table 4:

TABLE 4

| input messages | methods | output messages |
|---|---|---|
| Bind | handler registration | |
| Unbind | cancel handler registration | |
| HandleFault | 1. Retrieve handler<br>2. Start handler if found<br>3. Execute default if no handler is found | Start handler |

The object [[mCOOPFaultHandler] is an object [FaultHandler] associated with the mCOOP metaspace, and is used on occurrence of an exception event by the object on the mCOOP metaspace.

When the message [Bind] is entered from an object on the mCOOP metaspace, the object [mCOOPFaultHandler] registers the object and the method specified by the message [Bind] as a handler for the exception event specified by the message [Bind]. The exception event specified here is an exception event defined on the mCOOP metaspace. In the present embodiment, the above-mentioned exception event is directly used.

When fed with the message [Unbind] from the object on the mCOOP metaspace, the object [mCOOPFaultHandler] cancels the registration of the handler specified by the message [Unbind].

When the message [HandleFault] is entered from the object [ExceptionHandler], the object [mCOOPFaultHandler] executes the method in accordance with the message [HandleFault].

With this method, the handler associated with the exception identifier vFID sent by the message [HandleFault] is searched. The handler to be searched is a handler registered by the above-mentioned message [Bind] for the object specified by the message [HandleFault].

Although the above-mentioned object [mAVFaultHandler] converts the exception identifier vFID sent with the message [HandleFault] into an exception identifier mAVFID, there is no necessity for the object [mCOOPFaultHandler] to convert the exception identifier vFID to another exception identifier because the mCOOP metaspace directly used the exception identifier vFID as the exception identifier defined on the mCOOP metaspace.

If a registered handler is found, a message is sent to the registered object to start the registered handler. If no handler has been registered for the object specified by the message [HandleFault], the default exception processing previously registered on the mCOOP metaspace is executed in accordance with the exception identifier vFID sent with the message [HandleFault]. Specifically, the processing of deleting an object is previously registered on the mCOOP metaspace as a default exception processing. If no handler has been registered for the object specified by the message [HandleFault], appropriate messages are sent to plural metaobjects relevant to the mCOOP metaspace to delete the object. If the exception event specified by the exception identifier vFID is such an exception event that enables restoration of the processing in the mCOOP metaspace, it is also possible to send appropriate messages to plural objects relevant to the mCOOP metaspace in order to restore the object.

2-3-5 Migrator

As to the object [Migrator], input messages, methods executed when the messages are entered and messages outputted on executing the methods are shown in Table 5:

TABLE 5

| input messages | methods | output messages |
|---|---|---|
| MigrateHandler | notification to FaultHandler by exception | PostFault |
| MigrateReply | 1. Register new FaultHandler<br>2. Delete old FaultHandler | RegisterHandler |

The object [Migrator] is used when the object [FaultHandler] is to be replaced by a new object [FaultHandler] by eg., a version-up.

On reception of the message [MigrateHandler] commanding replacement of the object [FaultHandler] by a new object [FaultHandler], the object [Migrator] sends to the object [ExceptionHandler] a message [PostFault] containing the exception identifier vFID in order to replace the object [FaultHandler] specified by the message [MigrateHandler] by a new object [FaultHandler] specified by the message [MigrateHandler]. It is noted that a value [fMIGRATE_HANDLER] commanding replacement of the object [FaultHandler] is set in the exception identifier vFID of the message [PostFault].

The object which has sent the message [PostFault] to the object [ExceptionHandler] then receives a message [MigrateReply] from the old object [FaultHandler] to be replaced. The object [Migrator], on reception of the message [MigrateReply], sends a message [RegisterHandler] to the object [ObjectManager] in order to register the new object [FaultHandler] in the object [ObjectManager]. The object [Migrator] subsequently sends appropriate messages to the plural metaobjects relevant to the object [FaultHandler] in order to delete the old object [FaultHandler].

The processing of relacing the object [FaultHandler] with the new object [FaultHandler] using the object [Miigrator] is explained subsequently in detail taking an example of version-up of the object [mCOOPFaultHandler].

2-4 Scenario of Exception Processing

The processing employing the above objects is hereinafter explained taking specified examples. In the following explanation, the flow of a series of processing operations carried out on occurrence of a certain event is termed a scenario, while the object constituting an application program is termed a base object.

2-4-1 Scenario of Exception Processing on mAV Metaspace

First, the scenario of the exception processing carried out on occurrence of the exception event in an application program carried out on the [mAVFaultHandler] metaspace is explained.

Figure 7:
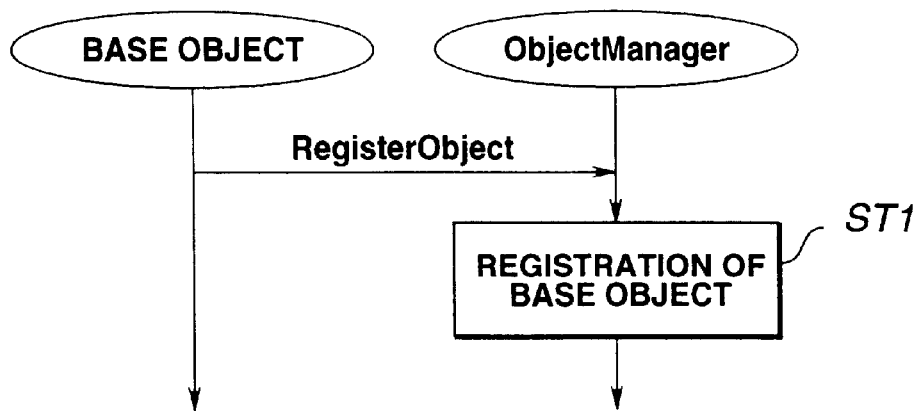
FIG. 7 illustrates registration of a base object by a message [RegisterObject].
Figure 8:
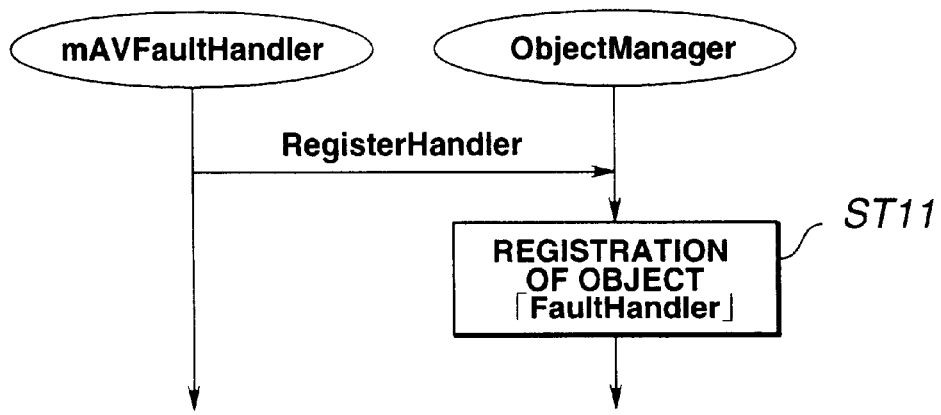
FIG. 8 illustrates registration of an object [FaultHandler] by a message [RegisterHandler].

First, the base object and the object [mAVFaultHandler] are registered in the object [ObjectManager]. That is, when an object is generated, the object registers itself in the object [ObjectManager] in the course of the generating process. FIG. 7 shows, for the case of generation of the base object, the procedure of registering the base object in the object [ObjectManager]. FIG. 8 shows, for the case of generation of the object [mAVFaultHandler], the procedure of registering the object [mAVFaultHandler] in the object [ObjectManager].

If the base object is generated, a message [RegisterObject] is sent from the base object to the object [ObjectManager], as shown in FIG. 7. The object [ObjectManager], receiving the message [Registerobject], registers the information on the base object as the internal information of the object [ObjectManager], as shown at step ST1. The information as to the base object is, for example, the ID or name of the base object or the information concerning the metaspace in which is present the base object.

When the object [mAVFaultHandler] is generated, the message [RegisterHandler] is sent from the object [mAVFaultHandler] to the object [ObjectManager]. The object receiving the message [RegisterHandler] registers the information on the object [mAVFaultHandler] as the internal information of the object [mAVFaultHandler] as shown at step ST11. The information on the object [mAVFaultHandler] includes the information specifying that the object [mAVFaultHandler] is an object [FaultHandler] sending a message to the application program responsible for an exception event that has occurred or the information concerning the ID or name of the object [mAVFaultHandler] or the metaspace in which the object handles exception processing.

Figure 9:
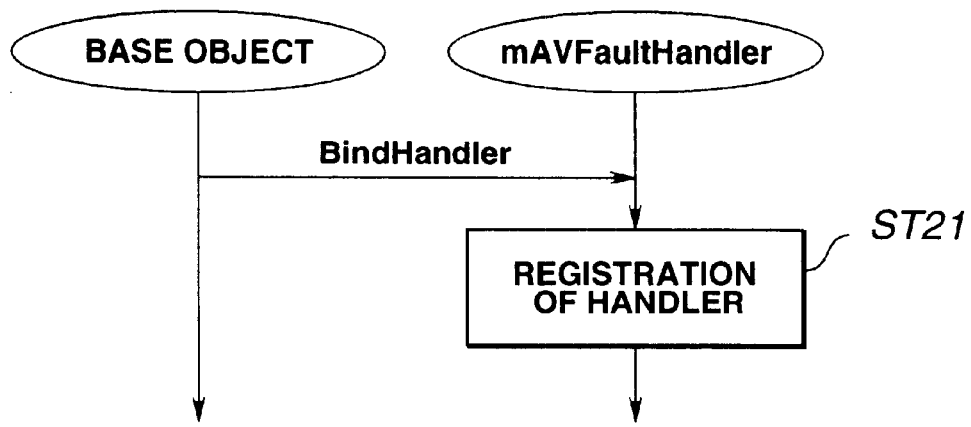
FIG. 9 illustrates registration of a handler by a message [BindHandler] in the mAV metaspace.

The base object registers the handler for executing the processing corresponding to the exception event that has occurred. FIG. 9 shows the procedure for the base object to register the handler. As shown in FIG. 9, when the base object registers the handler, a message [BindHandler] is sent from the base object to the object [mAVFaultHandler]. On reception of the message [BindHandler], the object [mAVFaultHandler] registers e.g., the information concerning the relation of correspondence between the handler and the exception identifier mAVFID, based on the information contained in the message [BindHandler], as the internal information of the object [mAVFaultHandler].

Figure 10:
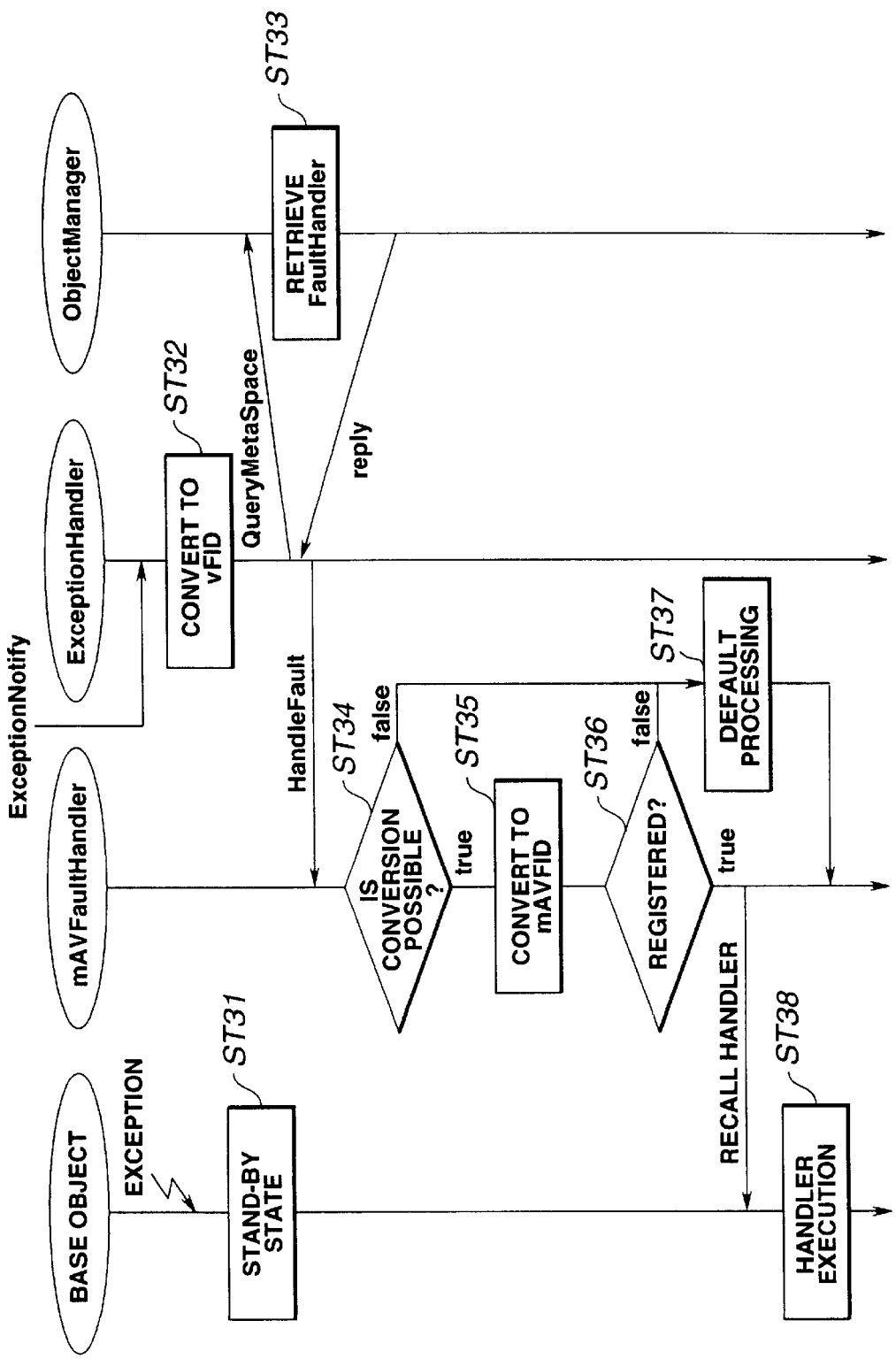
FIG. 10 illustrates the sequence of exception processing in a mAV metaspace.

The processing for exception processing, which is carried out after the above registration, is explained with reference to FIG. 10, which shows the procedure of exception processing which is executed on occurrence of hardware exception during execution of processing of the base object.

First, if hardware exception occurs during execution of the base object processing, the processing in the base object is interrupted to set up a standby state, as shown at step ST31. The message specifying the occurrence of the hardware exception [ExceptionNotify] is sent by the processor to the object [ExceptionHandler] In this message [ExceptionNotify] is contained the processor architecture dependent exception information.

The object accepting the message [ExceptionNotify] analyzes the exception information contained in the message [ExceptionNotify] to convert the exception information to the processor architecture independent exception identifier vFID. By this conversion, the object [mAVFaultHandler], which is an object executing the exception processing corresponding to the metaspace, can handle the exception event without dependency on the processor architecture.

The object [ExceptionHandler] then sends a message [QueryMetaSpace] to the object [ObjectManager] in order to identify the base object responsible for the exception event, from the message [ExceptionNotify], and to make inquiry about the information concerning the base object.

On reception of the message [QueryMetaSpace], the object [ObjectManager] retrieves the object [FaultHandler] corresponding to the base object identified by the message[QueryMetaSpace].

Specifically, the object [ObjectManager] identifies the metaspace in which is present the base object specified by the message [QueryMetaSpace], as specified by the message [QueryMetaSpace]. Since the totality of the base objects are registered on generation thereof in the object [ObjectManager] by the message [RegisterObject], as shown in FIG. 7, the object [ObjectManager] identifies the metaspace in which is present the base object specified by the message [QueryMetaSpace], with the aid of the registered information. The object [ObjectManager] then retrieves the object [FaultHandler] corresponding to the metaspace identified as described above. The object [FaultHandler] is an object executing exception processing of a specified metaspace, such as the object [mAVFaultHandler] or the object [mCOOPFaultHandler]. The information of these objects is also registered in the object [ObjectManager] by the message [RegisterHandler] on generation thereof, as shown in FIG. 8. Using the information thus registered, the object [ObjectManager] retrieves the object [FaultHandler] corresponding to the metaspace identified as described above. The object [ObjectManager] returns the results of the above retrieval to the object [ExceptionHandler] as a response to the message [QueryMetaSpace]. In the present embodiment, it is the object [mAVFaultHandler] that is returned.

The object [ExceptionHandler], receiving the response from the object [ObjectManager], sends a message

[HandleFault], containing the information responsible for the hardware exception and the information concerning the exception identifier vFID corresponding to the exception event, to the object [FaultHandler] specified by the response. In the present embodiment, the object [FaultHandler] specified by the response is the object [mAVFaultHandler]. The message [HandleFault] is sent to the object [mAvFaultHandler].

The procedure by the object [ExceptionHandler] is simply to send the message [HandleFault] to the object [FaultHandler] specified by the response. Thus, it is possible for the procedure to go on without dependency on possible dynamic generation of the metaspace or on possible dynamic movement of an object to another metaspace.

On reception of the message [HandleFault], the object [mAVFaultHandler] checks whether or not the exception identifier vFID sent with the message [HandleFault] can be converted into the exception identifier mAVFID defined with the mAV metaspace, as shown at step ST34. If the result is affirmative, the exception identifier vFID sent with the message [HandleFault] is converted into the exception identifier mAVFID defined with the mAV metaspace, as shown at step ST35.

After converting the exception identifier vFID to the exception identifier mAVFID, the object [mAVFaultHandler] retrieves the handler corresponding to the exception identifier mAVFID. The handler retrieved is a handler registered by the message [BindHandler], for the object specified by the message [HandleFault] as described above.

If, among the handlers, registered in the object [mAVFaultHandler], the handler corresponding to the exception identifier mAVFID, obtained by the above transformation, is found, the object [mAVFaultHandler] invokes and executes the handler found at step ST36. That is, the base object is responsive to the invocation from the object [mAVFaultHandler] to start and execute the handler, as shown at step ST38. Thus, the processing by the previously registered handler is executed as an exception processing for the hardware exception generated in the base object.

On the other hand, if the exception identifier vFID cannot be converted at step ST34 to the exception identifier mAVFID or if no handler corresponding to the exception identifier mAVFID has been registered at step ST36, the default exception processing previously registered for the mAV metaspace is executed responsive to the exception identifier vFID sent with the message [HandleFault].

The default processing may be exemplified by object deletion, overriding of exceptions and processing of restoration of exceptions. These processing operations are executed by sending appropriate messages from the object [mAVFaultHandler] to the metaobject relevant to the mAV metaspace.

The above is the scenario of the exception processing executed on occurrence of the exception event by the application program executed on the mAV metaspace.

2-4-2 Scenario of Exception Processing on mCOOP Metaspace

The scenario of exception processing performed on occurrence of an exception event by the application program executed on the mCOOP metaspace. Meanwhile, it is assumed that the application program ascribable for the exception event is made up of three objects, that is an object A, an object B and an object C, and that the exception event is produced by the object B.

First, the object A, object B, object C and the object [mcOOPFaultHandler] are first registered on the object [ObjectManager].

The objects A, B and C are registered by the same procedure as that shown in FIG. 7. That is, the base object in FIG. 7 is replaced by the objects A, B and C and the procedure shown in FIG. 7 is performed in order to register the objects A, B and C in the object [ObjectManager].

The object [mCOOPFaultHandler] is registered by a procedure similar to that shown in FIG. 8. That is, the object [mAVFaultHandler] in FIG. 8 is replaced by the object [mCOOPFaultHandler] and the procedure shown in FIG. 8 is executed to register the object [mCOOPFaultHandler] in the object [ObjectManager].

Figure 11:
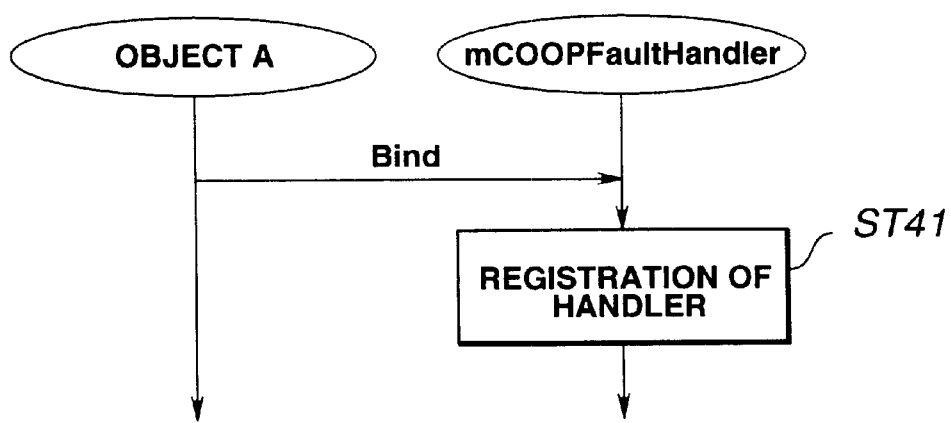
FIG. 11 illustrates registration of a handler by a message [Bind] in the mCOOP metaspace.

Next, a handler for executing the processing corresponding to an exception event that has occurred is registered. FIG. 11 shows the procedure for handler registration. FIG. 11 shows the procedure for registering a method C1 (C::C1) of the object C on the object [mCOOPFaultHandler] as a handler for executing the exception processing if an exception event has occurred during execution of the object B.

If the method C1 (C::C1) of the object C is registered by the object A as a handler, a message [Bind] is sent from the object A to the object [mCOOPFaultHandler] as shown in FIG. 11. The object which has received the message [Bind] registers the handler, based on the information contained in the message [Bind], as shown at step ST41. Specifically, the object [mCOOPFaultHandler] registers, at step ST41, the information concerning the object B being exception-processed, the information concerning the handler executing the exception processing on occurrence of an exception event during execution of the object B and the information concerning the exception identifier vFID corresponding to the handler are registered as the internal information of the object [mCOOPFaultHandler]. Meanwhile, the handler is the method C1 (C::C1) of the object C.

Figure 12:
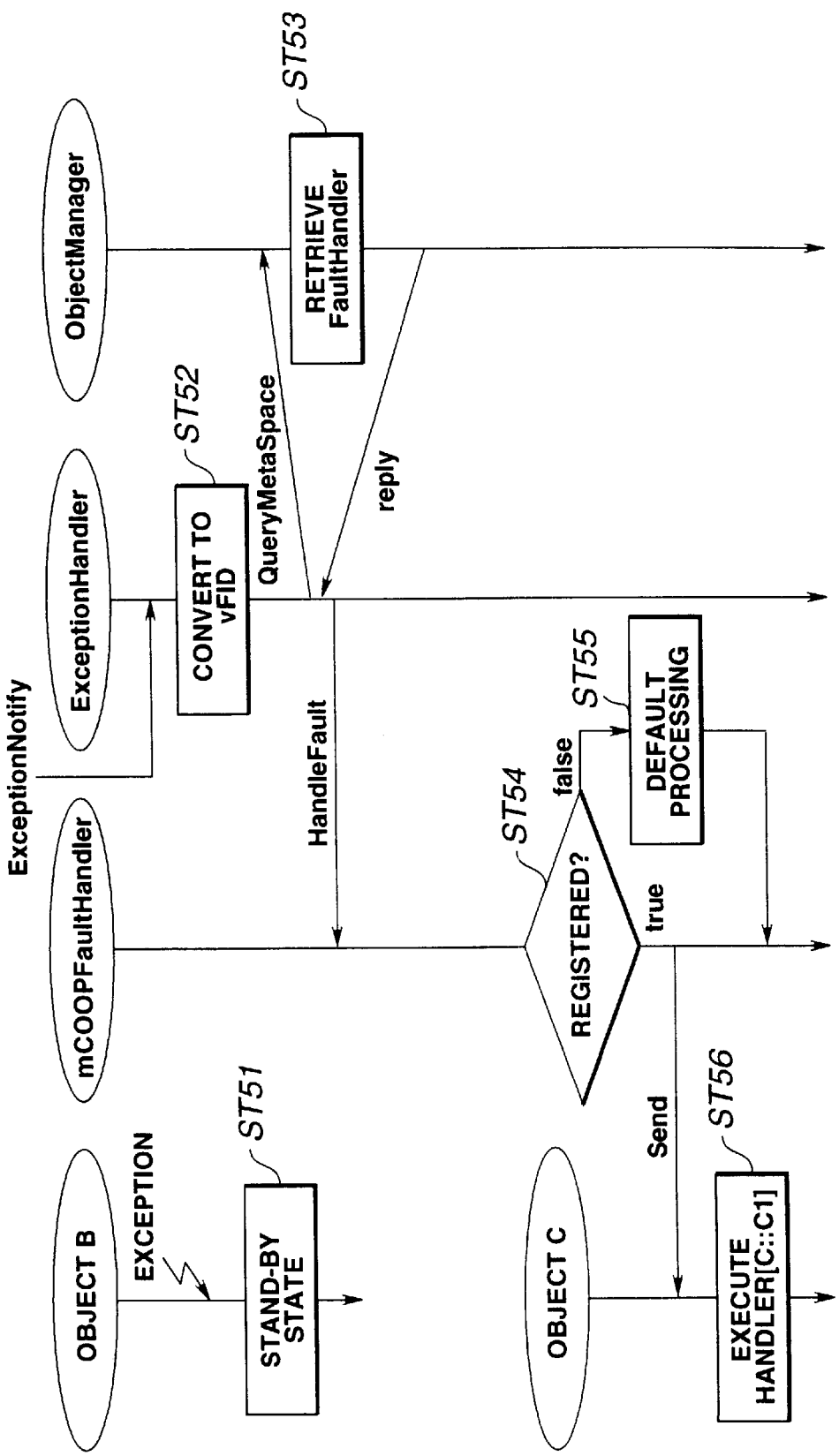
FIG. 12 illustrates the sequence of exception processing in the mCOOP metaspace.

The procedure of the exception processing executed after the above-mentioned registration is explained by referring to FIG. 12 which illustrates the procedure of the exception processing executed on occurrence of the hardware exception during execution of the processing by the object B.

First, if a hardware exception has occurred during execution of the processing by the object B, the processing at the object B is interrupted and in the standby state, while the message [ExceptionNotify] specifying the occurrence of the hardware exception is sent by the processor to the object [ExceptionHandler]. This message [ExceptionNotify] contains the processor architecture dependent exception information.

The object [ExceptionHandler] receiving the message [ExceptionNotify] analyzes the exception information contained in the message [ExceptionNotify] to convert the exception information to the processor architecture independent exception identifier vFID, as shown at step ST52. By this conversion, the object [mCOOPFaultHandler], which is an object executing the exception processing corresponding to the metaspace, can handle the information concerning the exception event without dependency on the processor architecture. Meanwhile, the processing at step ST52 is similar to that at step ST32 described above.

The object [ExceptionHandler] then identifies the base object responsible for the exception event, from the message [ExceptionNotify], and sends a message [QueryMetaSpace] to the object [ObjectManager] in order to inquire into the information concerning the base object.

On reception of the message [QueryMetaSpace], the object [ObjectManager] retrieves the object [FaultHandler]

corresponding to the base object specified by the message FQueryMetaSpace], as shown at step ST53. The object [ObjectManager] returns the results of retrieval as a response to the message [QueryMetaSpace] to the object [ExceptionHandler]. In the present embodiment, it is the object [mCOOPFaultHandler] that is returned. Meanwhile, the processing at step ST53 is similar to the processing at step ST33 except that it is the object [mCOOPFaultHandler] that is returned to the object [ExceptionHandler].

The object [ExceptionHandler], which has received the response from the object [ObjectManager], sends to the object [FaultHandler] specified by the response the message [HandleFault] containing the information concerning the object B responsible for the hardware exception and the information concerning the exception identifier vFID corresponding to the exception event. In the present embodiment, the object specified by the response is the object [mCOOP-FaultHandler] and the message [HandleFault] is sent to the object [mCOOPFaultHandler].

Meanwhile, the procedure by the object [ExceptionHandler] simply sends the message [HandleFault] to the object [FaultHandler] specified by the above response. Thus, it is possible for the object [ExceptionHandler] to proceed with the procedure without dependency on possible dynamic generation of the metaspace or on possible dynamic movement of an object to another metaspace. The object [mCOOPFaultHandler] which has received the message [HandleFault] first retrieves the handler corresponding to the exception identifier vFID sent by the message [Handle-Fault] as shown at step ST54. The handler to be retrieved is the handler registered by the message [Bind] for the object specified by the message [HandleFault], as described above.

In the above-described scenario for exception processing in the mAV metaspace, the exception identifier vFID is converted by the object [mAVFaultHandler] receiving the message [HandleFault] to the exception identifier mAVFID defined in the mAV metaspace. In the present embodiment, the exception identifier vFID is directly used as the exception identifier defined in the mCOOP metaspace, conversion of the exception identifier vFID is not required in the scenario of the exception processing in the mCOOP metaspace.

If, among the handlers registered in the object [mCOOPFaultHandler], such a handler that is associated with the exception identifier vFID is found, the object [mCOOPFaultHandler] sends to the object C a message [Send] commanding execution of the handler found at step ST54 to the object C (C::C1) from the object [mCOOP-FaultHandler] to the object C. The object C (C::C1) of the object C is a method registered in the object [mcOOPFault-Handler] as a handler executing the exception processing on occurrence of the exception event during execution of the object B.

The object C, which has received the message [Send] from the object [mCOOPFaultHandler], starts and executes the method C (C::C1) of the object C registered as the handler, based on the above message. Thus, the processing of the previously registered handler, that is the method C1 of the object C, is executed as an exception processing for the hardware exception that has occurred in the object B.

On the other hand, if the handler corresponding to the exception identifier vFID has not been registered at step ST54, the default exception processing previously registered for the mCOOP metaspace is executed responsive to the exception identifier vFID sent with the message [Handle-Fault].

The default processing may be exemplified by object deletion, exception overriding or exception restoration. This processing is executed by sending appropriate messages from the object [mCOOPFaultHandler] to the metaobject relevant to the mCOOP metaspace.

The above is the scenario of the exception processing executed on occurrence of an exception event by the application program executed on the mCOOP metaspace.

2-5 Scenario of Version-Up of mCOOPFaultHandler

The scenario of the dynamic version-up processing for the object [mCOOPFaultHandler] on the mCOOP metaspace is explained with reference to FIG. 13. In this scenario, the object of the new version-up is termed the object [new_mCOOPFaultHandler].

Figure 13:
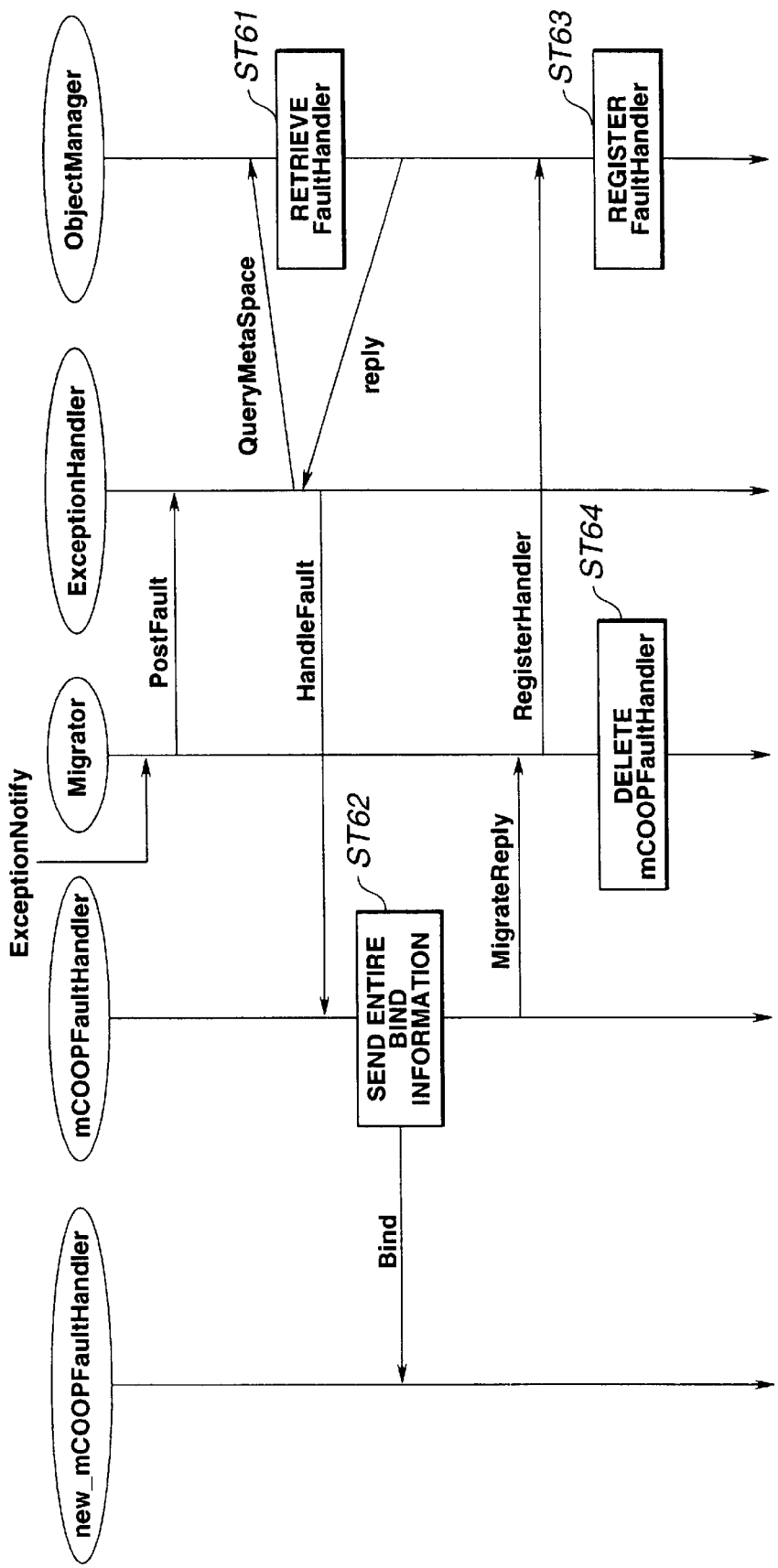
FIG. 13 illustrates the sequence of dynamic substitution of the object [mCOOPFaultHandler] using an object [Migrator].

Referring to FIG. 13, when the object [new_mCOOPFaultHandler] is downloaded from outside, a message [MigrateHandler] commanding replacing the object [mCOOPFaultHandler] by [new_mCOOPFaultHandler] is entered to the object [Migrator]. The message [MigrateHandler] contains the information specifying the downloading of the new object [new_mCOOPFaultHandler] and the information specifying to which metaspace corresponds the object [new-mCOOPFaultHandler].

The object [Migrator] on reception of the message [MigrateHandler] sends the message [PostFault] to the object [ExceptionHandler]. The message [PostFault] is a message which specifies an optional object on the metaspace corresponding to the object [new_mCOOPFaultHandler] as a dummy object and which specifies [fMigrateHandler] as an exception identifier vFID. That is, there is sent from the object [Migrator] to the object [ExceptionHandler] a message stating a software exception apparently has occurred in a dummy object. Meanwhile, [fMigrateHandler] is a previously registered value assumed to be used during replacement of the object [ObjectManager].

The object [ExceptionHandler] on reception of the message [postFault] executes processing similar to that when an exception event has occurred on an object on the metaspace corresponding to the object [new_mCOOPFaultHandler]. That is, the object [ExceptionHandler] sends a message [QueryMetaSpace] to the object [ObjectManager] in order to identify an object responsible for the exception event and to make an inquiry as to the information concerning the object. Meanwhile, the object responsible for the exception event here means the above-mentioned [dummy object].

The object [ObjectManager] on reception of the message [QueryMetaSpace] retrieves the object [FaultHandler] corresponding to the object specified by the message [QueryMetaSpace] as shown at step ST61. The object [Object-Manager] returns the results of retrieval to the object [ExceptionHandler] as a response to the message [QueryMetaSpace]. In the present embodiment, it is the object [mcOOPFaultHandler] that is returned. The processing in this step ST61 is similar to the processing at step ST33 or ST53.

The object [ExceptionHandler] on reception of the response from the object [ObjectManager] sends a message [HandleFault] to the object [mCOOPFaultHandler]. The message [HandleFault], containing the information concerning the dummy object and the information on the exception identifier vFID, also contains the information concerning the object [new_mCOOPFaultHandler] as the additional information.

The object [mCOOPFaultHandler] on reception of the message [HandleFault] retrieves the handler associated with the exception identifier vFID sent with the message [HandieFault]. However, in the present embodiment, no handler can be registered for the exception identifier vFID having a value [fMigrateHandler], so that the object [mCOOPFault- Handler] cannot find the handler. Thus, the object [mCOOP-FaultHandler] executes the previously registered default processing.

By way of the default processing for the exception identifier vFID having the value of [fMigrate_Handler], the processing of transferring the handler registered in the object [mCOOPFauItHandler] to the object [new_mCOOPFaultHandler] is previously registered.

That is, the object [mcoOPFaultHandler] transfers the information concerning the handler registered in the object [mCOOPFauItHandler] to the object [new_mCOOPFaultHandler] by the message [Bind] to the object [new_mCOOPFaultHandler]. The transfer of the message [Bind] from the object
object [mCOOPFaultHandler] to the object [new-mCOOPFaultHandler] is repeated until the entire information on the handler registered in the object [m_COOPFaultHandler] is sent to the object [new_mCOOPFaultHandler]. On termination of the processing at step ST62, the object [mCOOPFaultHandler] sends the message [MigrateReply] specifying the end of the processing to the object [Migrator].

The object [Migrator], advised of the end of the processing at step ST62, sends to the object [ObjectManager] a message [RegisterHandler] specifying that a new object [new_mCOOPFaultHandler] has now been generated. The object [ObjectManager] on reception of the message [RegisterHandler] registers the information concerning the object [new_mCOOPFaultHandler] specified by the message [RegisterHandler] as the internal information of the object [ObjectManager] as shown at step ST63. This registers on the object [ObjectManager] the ID or name of the object [new_mCOOPFaultHandler] and the information as to which metaspace is associated with the object.

On the other hand, the object [Migrator] which has sent the message [RegisterHandler] to the object [ObjectManager] deletes the object [mCOOPFaultHandler] as shown at step ST64. This processing of deletion is carried out by sending an appropriate message from the object pMigrator] to the metaobject pertinent to the object [mCOOPFaultHandler].

The above processing dynamically replaces the object [mCOOPFaultHandler]
by the object [new_mCOOPFaultHandler] to complete version-up. If, after termination of the version-up, an exception event has occurred in the mCOOP metaspace, the object [new_mCOOPFaultHandler] is used as the object [FaultHandler] in the mCOOP metaspace.

3. Summary

In the present embodiment, the object rExceptionHandler]is preliminarily registered as an object by which an error message is sent on occurrence of the exception event which might lead to interruption of normal execution of the application program. On occurrence of the exception event, the message [ExceptionNotify] is sent as a message indicating occurrence of the exception event to the object [ExceptionHandler] which then generates the exception identifier vFID which is an error message corresponding to the exception event specified by the message [ExceptionNotify]. The exception identifier vFID is a processor architecture independent error message. The exception identifier vFID is subsequently sent to the object [FaultHandler] which then sends a message commanding pre-set processing corresponding to the above-mentioned exception identifier vFID to the application program responsible for the exception event.

That is, if the hardware exception has occurred by the apparatus AP1 on the [mAVFaultHandler] metaspace, the message [ExceptionNotify] specifying the occurrence of the exception event is first sent to the object [ExceptionHandler]. It is noted that the message [ExceptionNotify] is a processor architecture dependent message. The object [ExceptionHandler] then generates a message [HandleFault] corresponding to the exception event specified by the [ExceptionNotify]. This message [HandleFault] is a processor architecture independent message. Also, this message [HandleFault] is a message prescribed depending on the types of the exception events without dependency on the execution environments of the application program AP1 which has caused the exception events, and contains the exception identifier vFID designed for discriminating the types of the exception events. This message is sent to the object [mAVFaultHandler]. The object [mAVFaultHandler] which has received the message [HandleFault] sends to the application program API a message commanding pre-set exception processing responsive to the exception event identified by the message [HandleFault]. The message sent to the application program AP1 is a message commanding invocation and execution of such one of the functions in the application program AP1 which describes the pre-set processing to be executed on occurrence of the exception event.

Figures 14A, 14B:
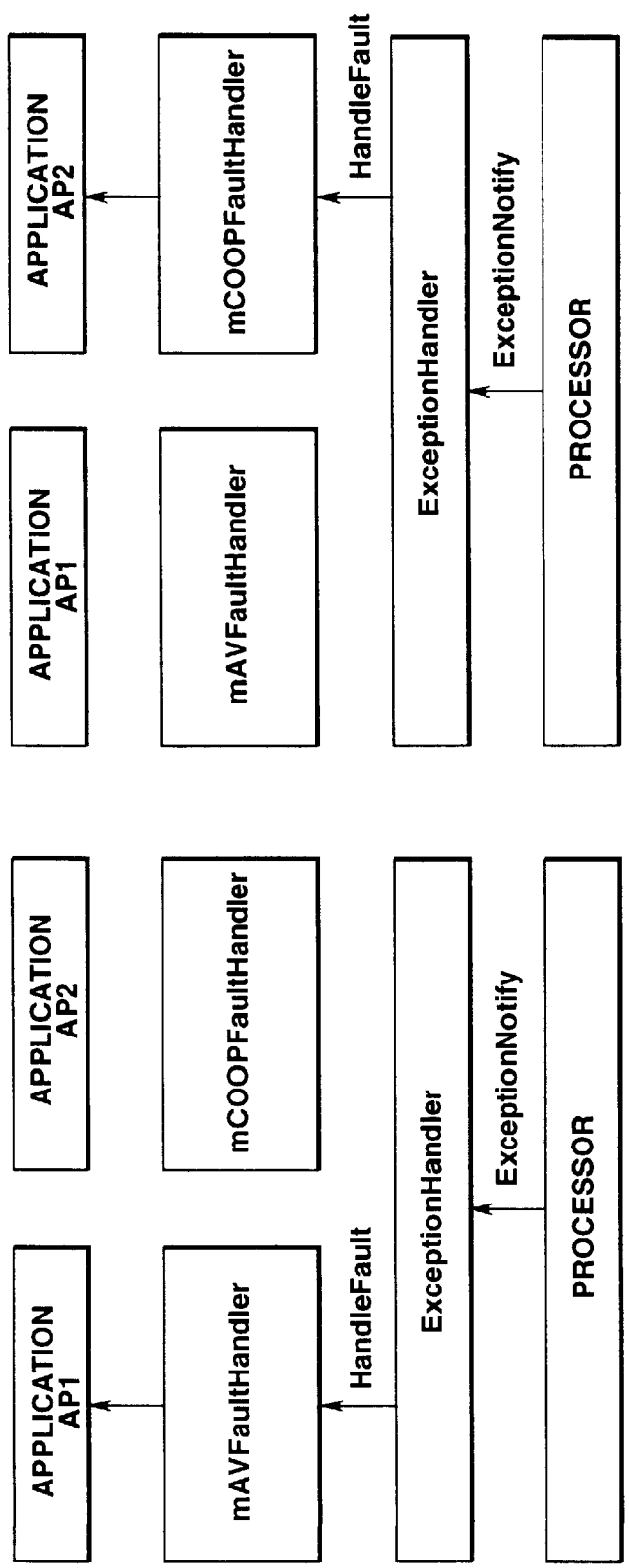
FIGS. 14A and 14B illustrates exception processing in accordance with the present invention.

If a hardware exception has occurred by the application program AP2 on the mCOOP metaspace, the message [ExceptionNotify] notifying the occurrence of an exception event is first sent to the object [ExceptionHandler], as shown in FIG. 14B. The message [ExceptionNotify] is a processor architecture dependent message. The object [ExceptionHandler] then generates a message [HandleFault] corresponding to the exception event specified y the message [ExceptionNotify]. This message [HandleFault] is a processor architecture independent message. Also, this message [HandleFault] is a message prescribed depending on the types of the exception events without dependency on the execution environments of the application program AP2 which has caused the exception events, and contains the exception identifier vFID designed for discriminating the types of the exception events. The object [mCOOPFaultHandler] which has received this message [HandleFault] sends to the application program AP2 a message commanding pre-set exception processing corresponding to the exception event identified by the message [HandleFault]. The message sent to the application program AP2 is sent to such one of objects in the application program AP2 that includes a method describing the pre-set processing executed on occurrence of the exception event.

In the present embodiment, as described above, only the object [ExceptionHandler] is the processor architecture dependent portion, while the remaining portion is processor architecture independent, as a result of introducing the exception identifier vFID. That is, with the present embodiment, by introducing the exception identifier vFID, the processor architecture dependent portion can be definitely demarcated from the processor architecture independent potion.

Therefore, if plural metaspaces having different exception processing environments are to be furnished, it is only necessary to take into account the interface with the exception identifier vFID as to exception processing, while it is unnecessary to take account of the processor architecture. Thus, the present invention provides plural metaspaces having different exception processing environments on a sole operating system.

For example, for adding metaspaces, it is only sufficient to take into account the interface with the exception identifier vFID as long as exception processing is concerned, while it is unnecessary to take account of the processor architecture. It is therefore possible to dynamically add the metaspace providing exception processing environments different from pre-exiting metaspaces.

When re-mounting the operating system on a different processor architecture, it suffices if only the object [ExceptionfHandler] converting the processor architecture dependent exception information to the exception identifier vFID. Thus, re-mounting on a different processor architecture can be achieved easily.

In the above-described embodiment, the exception identifier vFID is converted on the mAV metaspace executing the procedure type program to an exception identifier mAVFID defined on the mAV metaspace, while the exception identifier vFID is directly used in the mCOOP metaspace executing the object-oriented program. The present invention, however, is not limited to this configuration. Specifically, the exception identifier can directly be used in the mAV metaspace, or the exception identifier can be converted in the mCOOP metaspace to an exception identifier defined on the mCOOP metaspace.

In the above-described embodiment, the mAV metaspace for executing the procedure type program and the mCOOP metaspace for executing the object-oriented program are taken as examples. However, in applying the present invention, the number or types of the metaspaces can be set arbitrarily.

Also, the specified names for to the metaspaces, objects or messages are merely illustrative and also can be set arbitrarily.

What is claimed is:

1. A data processing method for processing an exception accommodating program recorded on a computer-readable recording medium, the method comprising the steps of:

registering an object supplied with an error message upon occurrence of an exception event associated with an interruption of normal execution of an application program;

causing a pre-set object to receive an exception occurrence message specifying occurrence of the exception event when the exception event occurs;

causing the pre-set object receiving the exception occurrence message to generate the error message, which corresponds to the exception event specified by the exception occurrence message and supplying the error message to the registered object;

sending a message to the application program associated with the exception event from the registered object commanding execution of a pre-set process, with said pre-set process determined to correspond to the error message; and modifying the registered object when the exception accommodating program is supplied with a message commanding change of the registered object.

2. The method as recited in claim 1, wherein the exception event occurs in a computational process of a processor executing the application program, the exception occurrence message depends on an architecture of the processor, and the error message does not depend on the architecture of the processor.

3. The method as recited in claim 1, wherein the error message corresponds to a type of the exception event without regard to execution environments of the application program associated with the exception event.

4. The method as recited in claim 1, wherein the application program includes functions stating a pre-set process to be executed upon occurrence of a specific exception event, and the message sent from the registered object to the application program commands invocation and execution of appropriate functions.

5. The method as recited in claim 1, wherein the application program contains an object stating a pre-set process to be executed upon occurrence of a specific exception event, and the message sent from the registered object which receives the error message to the application program is sent to the object stating the pre-set process.

6. An electronic apparatus including a recording medium having recorded thereon an exception accommodating program, the apparatus comprising:

a first processing portion for registering an object supplied with an error message upon occurrence of an exception event associated with an interruption of normal execution of an application program;

a second processing portion for causing a pre-set object to receive an exception occurrence message specifying occurrence of the exception event when the exception event occurs;

a third processing portion for causing the pre-set object receiving the exception occurrence message to generate the error message, which corresponds to the exception event specified by the exception occurrence message and supplying the error message to the registered object; and a fourth processing portion for sending a message to the application program associated with the exception event from the registered object commanding execution of a pre-set process, with said pre-set process determined to correspond to the error message, wherein when the exception accommodating program is supplied with a message commanding change of the registered object, the exception accommodating program performs a process to modify the registered object.

7. The electronic apparatus as recited in claim 6, wherein the exception event occurs in a computational process of a processor executing the application program, the exception occurrence message depends on an architecture of the processor, and the error message does not depend on the architecture of the processor.

8. The electronic apparatus as recited in claim 6, wherein the error message corresponds to a type of the exception event.

9. The electronic apparatus as recited in claim 6, wherein the application program includes functions stating a pre-set process to be executed upon occurrence of a specific exception event, and the message sent from the registered object which receives the error message to the application program is a message commanding invocation and execution of appropriate functions.

10. The electronic apparatus as recited in claim 6, wherein the application program contains an object stating a pre-set process to be executed upon occurrence of a specific exception event, and the message sent from the registered object which receives the error message to the application program is sent to the object stating the pre-set process.

* * * * *